Jan. 11, 1949. C. P. BOUCHER Re. 23,073
SPACE DISCHARGE TUBE AND ELECTRODE THEREFOR
Original Filed Sept. 14, 1942
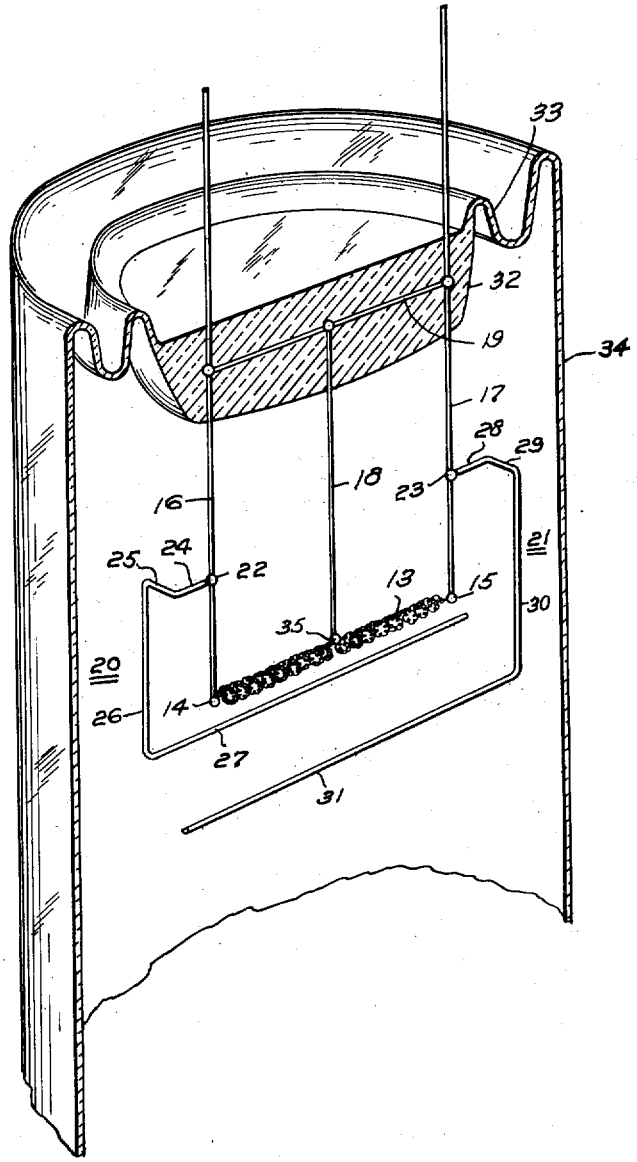
Inventor
CHARLES P. BOUCHER,
By John Howard Joyce
His Attorney Reissued Jan. 11, 1949

Re. 23,073

UNITED STATES PATENT OFFICE 23,073

SPACE DISCHARGE TUBE AND ELECTRODE THEREFOR

Charles Philippe Boucher, deceased, late of Newark, N. J., by National Inventions Corporation, New York, N. Y., a corporation of New Jersey, assignee Original No. 2,384,007, dated September 4, 1945, Serial No. 458,273, September 14, 1942. Application for reissue August 30, 1946, Serial No. 693,842

5 Claims. (Cl. 176—126)

The invention relates to space discharge tubes, and more particularly to filamentary electrodes for such tubes.

An object of the invention is the provision of electrodes suitable for use in space discharge tubes operating on cold-cathode, which electrodes are characterized by their resistance to detrimental effects of high peak voltages and currents, and which are simple, sturdy, reliable and efficient, of low over-all and minimum cost, and of long useful life.

Another object of the invention is the provision of an electrode of the type described which is characterized by its high electron-emitting qualities, by its uniform emissive qualities throughout useful life, which functions at uniform potential throughout the length of its included filament, which displays substantially the same physical strength at all points and is free of predictable zones of deterioration, which electrode is resistant against tearing of electron-emitting material therefrom during operation, and which permits in general the achievement of better operation of an associated tube structure, as well as the enjoyment of longer tube life.

Other objects and advantages of the invention will in part be obvious and in part pointed out hereinafter in connection with the following description, taken in light of the accompanying drawing.

The invention, accordingly, resides in the several elements, features of construction and operational steps, and in the relation of each of the same to one or more of the others, all as described herein, the scope of the application of which is indicated in the appended claims.

In the single figure of the drawing, there is shown in perspective view a preferred embodiment of the filamentary electrode of the invention.

As conducive to a more thorough understanding of the invention, it may be noted at this point that the use of filamentary electrodes in space discharge tubes has long been customary practice. The electrodes give rise to very satisfactory results when operated either at sub-standard voltages or even at the rated potentials of ordinary 110 or 220 volt service mains. When the electrodes are provided with an electron-emitting coating as is customary practice at this time, tube operation is reasonably insured almost regardless of the pressure conditions maintaining within the tube.

A conventional filamentary electrode usually takes the form of a substantially U-shaped member, shaped from small-diameter, oxide-coated wire spiraled into comparatively large loops. The end portions of the wire are connected at terminals to suitable current leads. A source of electrical energy connected across the leads, sends heating current through the filament and raises the same to a temperature at which copious quantities of electrons are emitted.

Experience shows, however, that in many instances, an arc between paired, spaced electrodes tends to settle across points on the electrodes of lowest potential dfference. This action, of course, exposes those points to excessive disintegration. Alternatively, in many instances, the arc settles on sharp, angular portions of the filaments, as at corners or bends. The arc locally attacks the filaments at these points much more vigorously than it does the remaining portions, so that comparatively early failure may reasonably be anticipated. Such local failure is accelerated particularly in those cases where, in accordance with recent practice, the electrode terminals are short-circuited for cold-cathode operation, and substantial potentials are impressed across the paired electrodes, such as 460 volts or more.

Similarly, bare filamentary electrodes when unprotected by any form of shielding are affected seriously and adversely under repeated bombardment of the arc, as when the lamp is turned on and off frequently. It is found that ionic bombardment results in sputtering of the electrode material. When sputtering occurs not only is the active material removed from the electrode filaments so that its electron-emitting qualities are impaired, but as well, the filaments are physically weakened, thus diminishing appreciably the effective life thereof. The sputtered or volatized electrode material deposits as a condensate on the interior walls of the tube in which the electrodes are mounted, forming a semi-opaque coating and materially reducing the transmission of light through the tube walls. This gives rise to the phenomenon encountered in the tube art of darkening of the tubes during use.

The use has been proposed of filament guards, but such guards as heretofore employed have not proven successful in hot-cathode tubes adapted for cold-cathode operation. The arc has been found to strike rather indiscriminately on the guards or on the filament. The filament is subjected to shock, breakdown and failure at the corners, bends, or points of lowest voltage. In those instances where the arc does strike first on the guards, then the arc often is found to move relatively slowly from the guards over to the filaments, so that an appreciable time interval is interposed before the tube comes up to its rated light emission.

A further object of the invention, therefore, is to provide filamentary electrodes which are suitable for cold-cathode operation, the filamentary portions of which in large measure are protected from shock, sputtering, and attendant destruction, which electrodes ensure rapid and steady operation of an associated tube and are instrumental in achieving improved light emission, and which avoid in large measure or minimize appreciably other defects and disadvantages set forth in the foregoing.

Referring now more particularly to a preferred embodiment of the invention, attention is directed to the single figure of the drawing, wherein is shown a tube electrode having a filament or central filamentary portion 13. The filament 13 is made, for example, of tungsten, molybdenum, or other suitable refractory metal or metal alloy wire of approximately No. 42 gauge. The wire, as shown, is doubly coiled, first into small diameter spiral loops and then into spiral loops of larger diameter. By virtue of the double coiling a large area of filament is presented per unit of length. This filament 13 has its ends 14, 15, and mid-portion 35 joined respectively, as by welding, to leads 16, 17, and central support 18. The leads and central support extend upwardly from the filament 13 and preferably are normal to the filament and in the same plane therewith. The leads, as well as the central support, are made of rather large diameter wire as compared to the filament, and serve to hold the filament in substantially straight position. Thus, the presence of angular bends is avoided in the active filament 13 of the new electrode construction and longer life of the filament or electrode, as a whole, accordingly is achieved.

After the filament 13 is anchored to the leads and to support 18, the filament is coated as well as the anchor points with an oxide-coating of high electron-emitting properties. The purpose of the oxide coating (or other electron-emitting material) is, of course, to ensure that sufficient electrons will be emitted to initiate and maintain a satisfactory tube arc, without requiring the central portion 13 to be brought to full incandescence.

The new electrode, aside from including a filament disposed on a substantially straight axis between leads 16 and 17, is further protected from disintegration and from developing local regions of possible failure, by ensuring that all parts of the filament 13 are at substantially the same potential. This end is achieved by short-circuiting the leads 16, 17 and support 18 by any suitable short-circuiting bar or element 19, disposed either at free ends of these elements or preferably intermediate their lengths. In this manner it is ensured that voltage distribution throughout the electrode assembly is uniform. The end of support 18, opposite from the filament 13, terminates, for example, in a conventional glass press 32 of glass tube 34, while the leads 16, 17 are either carried through the press, or directly through the reentrant portion 33 of the tube.

Still further, protection is afforded the filament 13 by the provision of a guard in the form of side-arms indicated generally at 20, 21, attached to and projecting respectively from leads 16, 17. While these side-arms 20, 21 could be attached at anchor points 14, 15, it is undesirable to have the arc, which strikes on the side-arms 20, 21, transferred to the central portion 13 at these anchor points because of the possibility of local attack. Accordingly, it is preferred to join the side-arms 20, 21 to leads 16, 17 at points 22, 23 intermediate the lengths of the leads.

Referring first to side arm 20, this side-arm extends, for example, outwardly at 24 in the plane of lead 16 and filament 13 and normally to lead 16, then is bent into a portion 25 extending out of the plane of lead 16 and filament 13, then is bent into a portion 26 which extends substantially parallel with lead 16 and below the central portion 13 (in the direction of an opposed electrode, not shown) and finally is bent into portion 27 which extends in spaced, offset and substantially parallel relation with central portion 13 so as to guard the same.

Similarly, side-arm 21 extends, for example, outwardly at 28 in the plane of lead 17 and filament 13 and normally to lead 17, then is bent into a portion 29 which extends out of the plane of lead 17 and filament 13 in an opposite direction to portion 25 of guard 20. The guard then is bent into a portion 30 which extends substantially parallel with lead 17 and below central portion 13 preferably to a point below side-arm portion 27 of side-arm 20, and finally is bent into portion 31 which extends in spaced, substantially parallel relation with filament 13 and portion 27. Side-arm portions 27, 31, accordingly, are disposed on opposite sides of filament 13 and are substantially parallel with each other. The portions 27, 31, preferably reach individually along the entire length of filament 13, or are of such length as to overlap in reach along the length of the filament.

While it is not essential that the side-arms 20 21 be so constructed, it is preferred to form them of strong heavy gauge wire, to provide a large area on which the effect of the tube arc striking thereon may be distributed. The wire preferably is made of metal or metal alloy, such as iron or stainless steel, which with increase in temperature displays on increase in electrical resistance, or, in other words, which displays a high temperature coefficient of resistance.

When a sufficiently high potential is first established across a space discharge tube employing electrodes constructed in accordance with the invention, the gas filling of the tube becomes excited and an arc settles quickly on one or both of the prong portions 27, 31 of the corresponding overlapping side-arms. At all times, the filamentary central portion 13 will be effectively shielded and protected from initial shock attendant upon striking the arc. By forming the side-arms, 20, 21 of material having high resistance characteristics, as aforesaid, the resistance of the side-arms increases appreciably with rise in the temperature thereof. The arc, accordingly, migrates rapidly up the side-arms to the corresponding lead 16 or 17, and thence down to the central portion 13, where it settles for steady operation. In this manner, it is ensured that the tube quickly approaches conditions of maximum luminosity, upon closure of the primary energizing circuit.

A fluorescent tube including two of the new electrodes and otherwise constructed along conventional lines, was tested on cold-cathode operation, using a 460 volt power unit. The tube was found to have a life approximating 3000 hours. In running life tests on the new tube unit, a check test was run on a hot-cathode tube of conventional design. This tube was short-circuited at its hot-cathode terminals, to adapt the same for cold-cathode operation. A power unit of the type just mentioned was employed under precisely the same energizing conditions as before. The tube thus operated displayed a life of approximately 2000 hours.

In another series of tests, two high voltage power units each having a condensive side (supplying a leading current) and an inductive side (supplying a lagging current), were connected in parallel at their input sides and operated from the same switch, so that voltage and temperature conditions and irregularities of the primary circuit would be the same for both units. One of the power units was connected with two tubes employing the new electrode construction. Two ordinary 40 watt tubes of standard design, now on the market and made by one of the larger manufacturers, but with their terminals short-circuited, were placed across the other power unit. The current was made and broken some 276 times per hour.

During the course of the test it was observed that the lamp energized across the condensive side of the corresponding power unit, failed after 29,256 cycles of on and off operation. The other lamp, energized on the inductive side of the power unit, still was in excellent condition, it being conservatively estimated that it could have withstood an additional 4000 to 5000 cycles of striking.

By contrast, the first of the lamps of conventional design placed across the condensive side of the second power unit needed replacement after about 12,834 cycles of operation. The second lamp, connected across the inductive side, secquired replacement after 18,147 cycles of operation. A third similar lamp, provided on the condensive side and replacing the first said lamp, was in turn worn out after 16,146 cycles of operation. It would appear that under comparable conditions of test, the new lamp may be expected to display a life of approximately double that of prior known lamps under similar operating conditions. The new lamp may be expected to display a practical life of 2800 hours, with at least 2500 hours minimum. The lamps can be produced without difficulty, and with the electrodes properly constructed, it is safe to predict that the minimum life of the commercial form of tubes employing my new filament may be raised to 3000 hours.

Thus it will be seen that there has been provided in this invention improved filamentary electrodes in which the various objects hereinbefore noted, together with many thoroughly practical advantages, are successfully achieved. It will be seen further that the electrodes lend themselves to durable, efficient and economical use in gaseous discharge tubes operated on cold-cathode. It will also be seen that the filaments of my electrodes individually are maintained at uniform potential throughout, are free of angular bends or projections, and are guarded effectively against sudden bombardment or shock, so as to avoid disintegration or sputtering either locally or generally.

As many possible embodiments may be made of the invention and as many changes may be made in the embodiment hereinbefore set forth, it is to be understood that all matter described herein is to be interpreted as illustrative and not in a limiting sense.

What is claimed is:

1. An electrode comprising a filament made of doubly coiled small gauge, oxide-coated wire, leads extending from the ends of said filament, a guard comprising side-arms, of heavy gauge metal of high temperature coefficient of resistance, extending outwardly and downwardly from said leads and under and along the length of said filament in spaced parallel relation thereto, and means short-circuiting said leads.

2. An electrode for space discharge tubes, comprising, a substantially linear filamentary portion; current leads extending from the ends of said filamentary portion; and a support wire extending from an intermediate point along said filamentary portion, said leads and said support wire being short-circuited.

3. An electrode for space discharge tubes comprising, a filamentary, electron-emitting portion; leads extending upwardly from opposite ends of said filamentary portion; a support wire extending upwardly from said filamentary position intermediate the ends thereof, said leads and said support wire being short-circuited; and a guard comprising side-arms extending outwardly from said leads intermediate their lengths and downwardly to substantially parallel guarding position with respect to said filamentary portion.

4. An electrode for space discharge tubes comprising, in combination, an oxide-coated filament, a guard having a side-arm of high temperature coefficient of electrical resistance positioned adjacent said filament and in electrical connection therewith, and means permanently short-circuit said filament and said guard.

5. A gaseous tube having a filament therein and having current conducting leads attached thereto and extending through a wall of the tube, and a short-circuiting bar connected across said leads intermediate their lengths.

NATIONAL INVENTIONS CORPORATION,
*Assignee of Charles Philippe Boucher, Deceased,*

BY FREDERICK H. SKROTZKI,
*Vice-President.*

REFERENCES CITED

The following references are of record in the file of this patent:

UNITED STATES PATENTS

| Number | Name | Date |
|---|---|---|
| Re. 18,798 | Van Wedel | May 26, 1931 |
| 2,068,595 | Burns | Jan. 19, 1937 |
| 2,171,234 | Freeman | Aug. 29, 1939 |
| 2,249,672 | Spanner | July 15, 1941 |
| 2,251,046 | Gaidies | July 29, 1941 |
| 2,259,040 | Inman | Oct. 14, 1941 |
| 2,298,904 | Scott | Oct. 13, 1942 |